Sept. 9, 1952　　　　　　　　　J. A. LOVE　　　　　　　　2,609,647
TRACTOR MOUNTED DISK HARROW

Filed Sept. 22, 1947　　　　　　　　　　　　　　　　2 SHEETS—SHEET 1

INVENTOR.
JABEZ A. LOVE
BY
Utsch + Knoblock
ATTORNEYS.

Sept. 9, 1952           J. A. LOVE           2,609,647

TRACTOR MOUNTED DISK HARROW

Filed Sept. 22, 1947           2 SHEETS—SHEET 2

INVENTOR.
JABEZ A. LOVE.
BY
Oltsch & Knoblock
ATTORNEYS.

Patented Sept. 9, 1952

2,609,647

UNITED STATES PATENT OFFICE 2,609,647

TRACTOR MOUNTED DISK HARROW

Jabez A. Love, Silver Creek Township, Cass County, Mich.

Application September 22, 1947, Serial No. 775,540

3 Claims. (Cl. 55—83)

1

This invention relates to improvements in disk harrows of the lift-up type which are adapted to be used with a tractor having a power-operated lift hitch mechanism, and particularly a hitch mechanism of the type having three connections spaced vertically and transversely to accommodate the lifting and lowering of an implement connected thereto.

The primary object of this invention is to provide a disk harrow of this type which is simple in construction, sturdy and inexpensive.

A further object is to provide a disk harrow of this type which is so constructed as to be compact in size and light in weight to hold to a minimum the leverage required to be exerted to lift the harrow bodily.

A further object is to provide a harrow of this type having a main frame and a plurality of disk gangs, each including a frame, with novel means for connecting said gangs to said frame in selected adjustment for desired ground-working action.

A further object is to provide a harrow of this type having a main frame and a plurality of disk gangs, each including a frame which is connected to the main frame above the disk blades of each gang, with means for restraining vertical tilting of the disk gangs incident to ground-working action of the harrow.

A further object is to provide a harrow of the lift type, which has a rigid frame of simple sturdy construction connected to the upper portions of rigid sub-frames forming a part of each of the plurality of disk gangs in such a manner as to transmit draft stresses from a tractor to the disk blades of the gangs below the frame without damage to either the frames or the disk gangs and without disturbance of the desired setting of the gangs.

Other objects will be apparent from the following specification.

Figure 1:
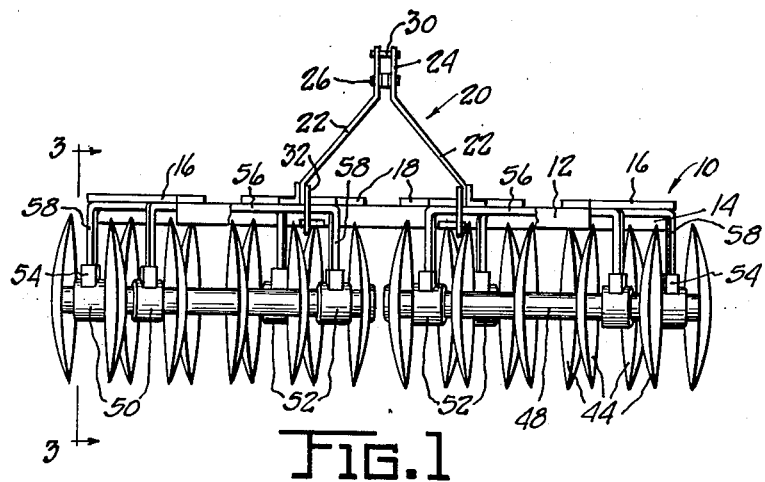
Fig. 1 is a view of the harrow in front elevation with part of the main frame broken away.
Figure 2:
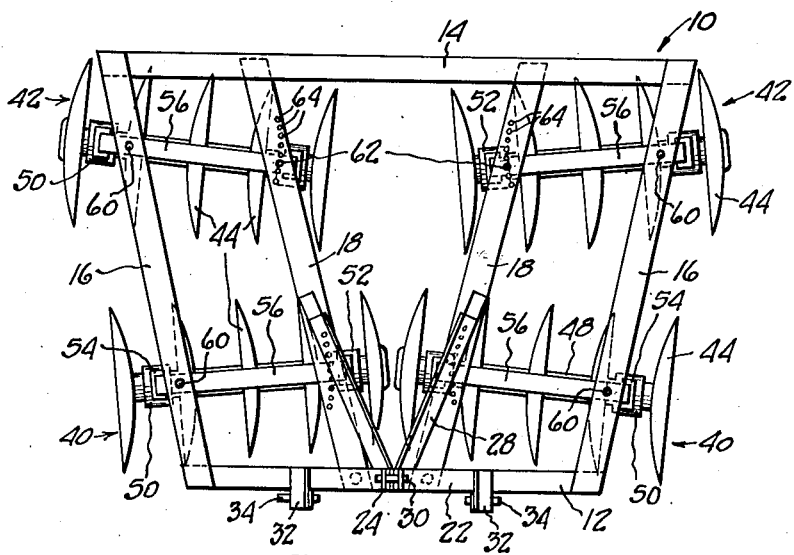
Fig. 2 is a top plan view of the harrow.
Figure 3:
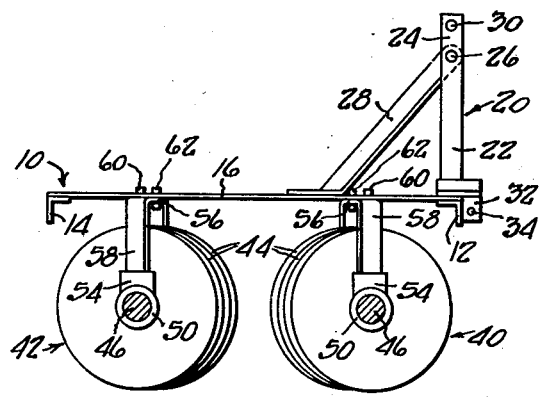
Fig. 3 is a sectional view of the harrow taken on line 3—3 of Fig. 1.

Referring to the drawings which illustrate the preferred embodiment of the invention, and particularly to Figs. 1 to 3 thereof, the numeral 10 designates a rigid main frame which is preferably constructed from a rigid front bar 12, a rigid rear bar 14, rigid side bars 16 and rigid intermediate bars 18, wherein the opposite ends of the bars 16 and 18 are bolted, welded or otherwise fixedly secured to the front frame member 12 and the rear frame member 14 in such a manner as to provide a strong, sturdy, simple, substantially flat frame member or unit.

The frame 10 is provided at its front central portion with a superstructure 20 which includes a pair of rigid members 22, each rigidly secured to the front frame member 12 in spaced relation to the center thereof and inclining upwardly to terminate in upper portions 24 fixedly secured together by a bolt 26 extending therethrough and also serving to connect the upper ends of a pair of rigid members 28 which diverge rearwardly outwardly and are secured to the frame members 18 by weld joints or other means. The members 22 and 28 cooperate to provide a rigid structure in which a bolt 30 is removably mounted preferably at the upper ends of the parts 24. The bolt 30 is adapted for connection of one member of a power hitch mechanism (not shown). Brackets 32 are fixedly connected to the front frame member 12 on opposite sides of the center thereof and each fixedly mounts a pin 34. The pins 34 are adapted for connection of two other parts of a power hitch mechanism (not shown) thereto. Thus it will be apparent that the combination of the superstructure with its bolt 30 and the brackets 32 with their pins 34 provide three points of connection for a power hitch, which points of connection are spaced apart vertically and transversely. In hitch devices of this character two arms which are connected to the pins 34 are in tension when the device is used to pull an implement, and the third arm or link which is connected to the bolt 30 is in compression. Thus the angle or working attitude of the implement may be controlled while the implement is drawn for the purpose of working the ground.

For the purpose of illustration, the harrow has been shown herein as a disk harrow of the tandem type. It will be understood, however, that this illustration is illustrative only and that the invention may be embodied in a single action harrow as well as in the tandem type. In the tandem type illustrated, two front disk gangs 40 and two rear disk gangs 42 are provided. Each of the disk gangs comprises a plurality of disk blades 44 mounted upon a common shaft or axle 46 in concentric relation and in predetermined spacing. Suitable spacers 48 are interposed between the disk blades of each gang and serve to maintain the desired spacing of the disk blades. Each disk gang includes an outer bearing 50 and an inner bearing 52. These bearings have sockets 54 projecting upwardly therefrom.

A rigid gang frame is provided which is of inverted U-shaped form having an upper horizontal frame part 56 and a pair of rigid depending leg portions 58 at its opposite ends. The leg portions 58 fit into the sockets 54 of the bearings 50 and 52. The length of the horizontal portion 56 of each frame is preferably greater than the spacing between adjacent frame members 16 and 18 of the main frame. One of the ends of each disk gang frame is bolted or otherwise secured as at 60 to the outer member 16 of the main frame, and the other end of each disk gang frame is bolted or otherwise secured to the adjacent intermediate main frame member 18 at 62. The parts are so constructed that the upper horizontal portion 56 of each disk gang will bear flat against the frame members 16 and 18 to maintain the depending arms 58 of the disk gang frames in upright position. In the tandem type of harrow here illustrated, the front disk gangs 40 are secured to the frame members 16 and 18 adjacent their forward ends, and the rear disk gangs 42 are secured to the frame members 16 and 18 adjacent their rear ends with sufficient clearance between the gangs to accommodate adjustment of the gangs to control the angle or setting of the disk blades with reference to the line of draft of the harrow. This adjustment is permitted by providing one or both of the frame members 16, 18 with a series of spaced openings 64 at which the bolt or other connections 60, 62 between the main frame and the disk frame are effected.

It will be apparent that this construction of disk harrow is very simple in construction and that its simplicity reduces the number of parts to a minimum so that both the cost and the weight of the implement is similarly held at a minimum. In the event it is found desirable to add weight to secure the proper operation of the implement, this can be done in any desired manner by detachably connecting weight members upon the implement main frame 10 or by providing a container or box upon the main frame within which weight elements may be held. Consequently, all of the advantages of light weight are secured without objection because the advantages of greater weight can be secured by adding weight to the harrow, as explained. The provision of the main frame 10 in substantially flat form as shown facilitates the compact arrangement of the harrows in a knockdown form preparatory to shipping in such cases where the disk gangs are disconnected from the main frame for shipping purposes. The rigidity of the removable connection of each disk gang with the main frame at points 60 and 62 accommodates the application of draft force at the level of the frame and its transmission through the disk gang frames to the disk blades without injury to the harrow.

Figure 5:
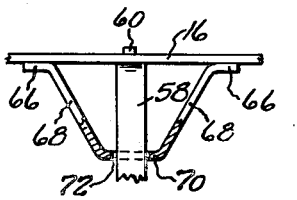
Fig. 5 is a fragmentary side view of a portion of the harrow illustrating one form of means for restraining vertical tilting of the disk gangs.

In the event it is desired to reinforce the disk gangs against vertical tilting of the frame incident to the transmission of the draft pull from the main frame through the disk gang frame to the disk blades, the construction as illustrated in Fig. 5 may be employed. In this construction one of the main frame members, preferably the outer member 16, to which the disk gang frame is bolted at 60, has a substantially V-shaped rigid bracket secured thereto. This bracket preferably comprises a rigid bar whose ends 66 extend in coplanar relation and are welded, bolted or otherwise secured rigidly to the main frame member in face engagement therewith as shown. Downwardly converging portions 68 extend from the terminal portions 66 and are joined together by a central horizontal part 70 spaced below the main frame. This central member 70 has an aperture 72 therein through which the leg 58 of the disk gang extends with sufficient freedom to permit angular adjustment of the disk gang to desired setting but sufficiently snug to prevent any substantial vertical tilting of the arm 58 incident to stress applied thereto during the use of the implement. It will be apparent that a similar construction may be applied at both ends of the frame of each disk gang if desired, but this requires adjustable mounting of the reinforcing bracket at one end of each disk gang in order to accommodate angular adjustment on a change of setting of the disk gangs.

Figure 6:
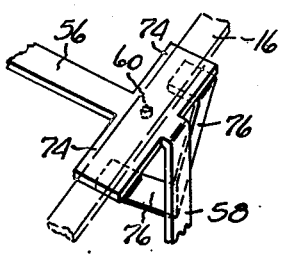
Fig. 6 is a fragmentary perspective view of a sub-frame of the harrow constructed to restrain vertical tilting of disk gangs.

A second form or construction of the harrow which serves the same purpose of preventing vertical tilting of the disk gang frames incident to the pull exerted in the use of the harrow is illustrated in Fig. 6, wherein the horizontal part 56 of each disk gang frame is provided, at least at one end thereof, with rigid laterally extending wings 74 which are adapted to underlie the adjacent one of the frame members 16, 18. Braces 76 are anchored by welding or other means to the outer end portions of the wings 74 and converge downwardly and inwardly to be welded or otherwise secured to the adjacent depending leg 58 of the disk gang frame in spaced relation below the level of the horizontal parts 56, 74 of said disk gang frame. It will be apparent that when the wings 74 are made of sufficient width they will underlie the cooperating main frame member regardless of the angle of adjustment or the setting of the disk gangs and that any tendency of the disk gang frame to tilt vertically is effectively withstood by the wings 74.

Figure 4:
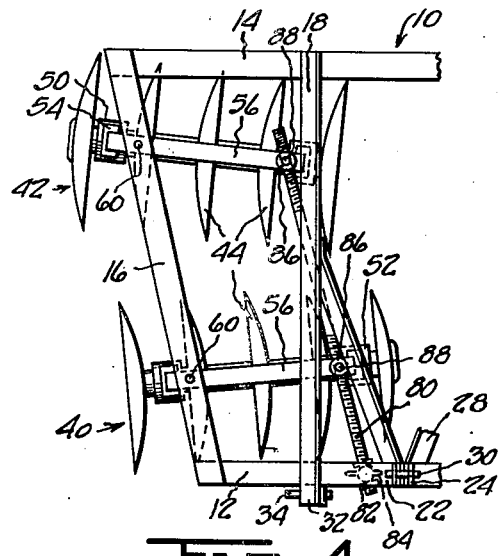
Fig. 4 is a fragmentary top plan view of a harrow having a modified construction of means for adjusting the setting of the disk gangs.

A further alternative embodiment of the invention is illustrated in Fig. 4, wherein the parts bear the same reference numerals as are used in Figs. 1 to 3. In this embodiment the disk gang frames are pivoted at their outer ends to the main frame members 16, as in the preferred embodiment, and underlie and engage the intermediate frame members 18 at their inner ends, but are not secured thereto as in the preferred form. Instead, a double-acting elongated screw 80 is journaled at one end in a suitable bearing 82 carried by one of the transverse frame members of the main frame here shown as the front frame member 12, which front frame member is slotted at 84 to permit said bearing 82 to assume any selected position along the length of the slot 84. The inner ends of the disk gang frame members 56 have blocks 86 swivelly connected thereto at 88 and preferably extending in depending relation to the disk gang frame part 56. These blocks have transverse screw-threaded portions therein adapted for threaded connection with oppositely threaded end portions of the screw-threaded shaft 80. It will be apparent that when the shaft 80 of this construction is rotated in one direction, the angular position of the axes of the two disk gang shafts with respect to the direction of pull or draft of the implement will be simultaneously adjusted in a complementary manner, that is, as the angular relation of the axis of the front disk gang with respect to the perpendicular of the line of draft increases incident to rearward shifting of the inner end of the front disk frame, the inner end of the rear disk frame will simultaneously be drawn forwardly as will be obvious. It will be apparent that the shaft 80, in addition to its function of adjusting the angular setting of the disk gangs, serves the additional function of stabilizing the inner ends of the disk gangs and retarding vertical tilting thereof. It is desirable in this modified embodiment to provide the inner ends of the disk, and along frames which are subject to adjustment by the shaft 80, with some means for holding them in proper relation to the main frame to permit the main frame to bear the weight thereof when the harrow is lifted bodily from the ground, and for this purpose cable means, chains or stirrups may be provided which are anchored to the main frame and pass under the part 56 of the disk gang frame to support the inner end of each disk gang.

While the form of the invention herein described and illustrated is preferred, it will be understood that changes may be made therein within the scope of the appended claims without departing from the spirit of the invention.

I claim:

1. A disc harrow comprising a rigid horizontal main frame including front and rear frame members and opposite side and intermediate members secured to said front and rear members and having apertures therein arranged in a plurality of sets extending at different angles transversely of the frame, a plurality of disc gangs each including an elongated rigid sub-frame projecting above and journaling a disc blade shaft, means cooperating with selected sets of frame apertures for securing said sub-frames to and in engagement with the side and intermediate members of said main frame spaced above said shaft and in selected working position, a superstructure carried by the front central portion of said main frame, and at least three spaced connector elements, at least one connector element being carried by said superstructure, and means for holding said sub-frame in selected upright position with said shafts positioned substantially directly below the members securing said sub-frame to said main frame, said last named means including a part carried by one frame and engaging the other frame at a point spaced from a securing means.

2. A disc harrow comprising a rigid horizontal main frame including a plurality of longitudinal and transverse rigid members, an upwardly projecting superstructure secured to the front central portion of said frame, a plurality of connectors carried by said frame and superstructure in vertically and laterally spaced relation, a plurality of disc gangs each including a shaft and a plurality of spaced disc blades, an elongated rigid sub-frame of inverted U-shape journaling each disc gang shaft with its intermediate portion extending substantially horizontally above said disc blades, means for securing the intermediate portion of each subframe to and in engagement with said longitudinal members of said main frame at longitudinally spaced points of said sub-frame spaced above said shaft and in a selected one of a plurality of angular positions, and means cooperating with said main frame and sub-frame for limiting vertical tilting of said sub-frames including a part carried by one of said frame and engaging the other frame spaced from said securing means.

3. A disc harrow comprising a rigid horizontal main frame including an upwardly projecting superstructure at the front central portion of said frame, a plurality of connectors carried by said frame and superstructure in vertically and laterally spaced relation, a plurality of disc gangs each including a shaft and a plurality of spaced disc blades, an elongated rigid sub-frame of inverted U-shape having depending legs journaling each disc gang shaft and an intermediate portion extending substantially horizontally above said disc blades, means for securing the intermediate portion of each sub-frame to and in engagement with said main frame in vertically spaced relation above said shaft and in a selected one of a plurality of angular positions, and rigid bracing means carried by said frame and having a portion engaging at least the outer leg portion of each sub-frame spaced below said main frame and said securing means and accommodating rotation of said leg about its axis.

JABEZ A. LOVE.

REFERENCES CITED

The following references are of record in the file of this patent:

UNITED STATES PATENTS

| Number | Name | Date |
|---|---|---|
| 914,921 | Bukacek et al. | Mar. 9, 1909 |
| 977,099 | King | Nov. 19, 1910 |
| 1,036,652 | Lathrop | Aug. 27, 1912 |
| 1,070,014 | Christianson | Aug. 12, 1913 |
| 1,245,295 | Willis | Nov. 6, 1917 |
| 1,247,017 | Sharp | Nov. 20, 1917 |
| 1,248,706 | Porteous | Dec. 4, 1917 |
| 2,152,347 | Ferraro | Mar. 28, 1939 |
| 2,320,624 | Love | June 1, 1943 |
| 2,336,848 | Cruse | Dec. 14, 1943 |
| 2,450,236 | Hoffman | Sept. 28, 1948 |